United States Patent [19]

Nonaka

[11] Patent Number: 5,578,933
[45] Date of Patent: Nov. 26, 1996

[54] DISTANCE MEASURING SYSTEM

[75] Inventor: Kenichi Nonaka, Wako, Japan

[73] Assignee: Honda Giken Kogyo Kabushiki Kaisha, Tokyo, Japan

[21] Appl. No.: 383,783

[22] Filed: Feb. 6, 1995

[30] Foreign Application Priority Data

Feb. 4, 1994 [JP] Japan ................................. 6-012367

[51] Int. Cl.$^6$ ........................................ G01S 11/00
[52] U.S. Cl. ........................ 324/639; 324/637; 324/644; 324/72; 342/125; 342/129; 342/384
[58] Field of Search ................................. 342/125, 129, 342/384; 356/27; 250/342; 324/72, 637, 639

[56] References Cited

U.S. PATENT DOCUMENTS

| 4,672,305 | 6/1987 | Coleman | 324/72 |
| 4,785,291 | 11/1988 | Hawthorne | 342/125 |
| 5,194,906 | 3/1993 | Kimura | 342/125 |
| 5,220,332 | 6/1993 | Beckner | 342/125 |
| 5,424,747 | 6/1995 | Chazuelas | 342/125 |

*Primary Examiner*—Kenneth A. Wieder
*Assistant Examiner*—Jose M. Solis
*Attorney, Agent, or Firm*—Lyon & Lyon

[57] ABSTRACT

A distance measuring system for measuring a distance between two objects has a transmitter assembly mounted on one of the two objects, for transmitting a plurality of electromagnetic waves having respective wavelengths different from each other at respective levels toward the other of the two objects, a receiver assembly mounted on the other object, for receiving the electromagnetic waves transmitted from the transmitting means, and a distance detector for detecting a ratio of levels at which at least one set of electromagnetic waves of the electromagnetic waves is received by the receiving means, as corresponding to a distance between the two objects, and determining the distance between the two objects from the ratio.

32 Claims, 4 Drawing Sheets

DISTANCE MEASURING SYSTEM

BACKGROUND OF THE INVENTION

1. Field of the Invention

The present invention relates to a distance measuring system for measuring the distance between two objects using an electromagnetic wave.

2. Description of the Related Art

Heretofore, an FM-CW radar system, for example, has been known as a distance measuring system for measuring the distance between two objects using an electromagnetic wave. The FM-CW radar system transmits a frequency-modulated electromagnetic wave from one object (hereinafter referred to as a "measuring object") toward another object (hereinafter referred to as a "measured object"). A reflected electromagnetic wave from the measured object is received by the measuring object. A signal representing the reflected electromagnetic wave which is received by the measuring object is delayed from a signal representing the electromagnetic wave which is emitted from the measuring object, by a time lag that corresponds to a period of time required for the electromagnetic wave to travel back and forth between the objects. Comparison of these transmitted and received signals on the same time base shows that there is developed a frequency difference between the transmitted and received signals which is proportional to the distance between the objects. The FM-CW radar system detects such a frequency difference and determines the distance between the objects based on the detected frequency difference.

In order to determine the distance between the objects, it is therefore necessary for the FM-CW radar system to detect a frequency difference between the received signal which represents the electromagnetic wave reflected directly from the measured object and the transmitted signal. Actually, however, the received signal contains various components which represent indirect electromagnetic waves which return from the measured object via other objects and are received by the measuring object. Therefore, the FM-CW radar system is required to extract only a component of the received signal which represents the electromagnetic wave reflected directly from the measured object, in order to accurately measure the distance between the objects. To meet such a requirement, the FM-CW radar system has to effect complex signal processing such as a frequency analysis, etc., and is necessarily complex in structure and expensive to manufacture. When the FM-CW radar system effects a frequency analysis on the received signal and extracts a spectrum which corresponds to the directly reflected electromagnetic wave and is required to determine the distance between the objects, the spectrum contains various frequency components produced due to the configuration of the reflecting surface of the measured object and the positional relationship thereof to the measuring object. The various frequency components contained in the spectrum make it difficult to specify the frequency that corresponds to the distance between the objects, and hence to accurately determine the distance between the objects.

SUMMARY OF THE INVENTION

It is therefore an object of the present invention to provide an improved distance measuring system of simple arrangement which can easily determine the distance between two objects.

Another object of the present invention is to provide a distance measuring system which is capable of determining the distance between two objects with good detecting accuracy under various climatic conditions.

Still another object of the present invention is to provide a distance measuring system which can increase the accuracy of detection of the distance between two objects.

To achieve the above objects, there is provided in accordance with the present invention a distance measuring system for measuring a distance between two objects, comprising transmitting means adapted to be mounted on one of the two objects, for transmitting a plurality of electromagnetic waves having respective wavelengths different from each other at respective levels toward the other of the two objects, receiving means adapted to be mounted on the other object, for receiving the electromagnetic waves transmitted from the transmitting means, and distance detecting means for detecting a ratio of levels at which at least one set of electromagnetic waves of the electromagnetic waves is received by the receiving means, as corresponding to a distance between the two objects, and determining the distance between the two objects from the ratio.

Electromagnetic waves having different wavelengths are transmitted by the transmitting means on one of the objects, propagated through the atmosphere, and received by the receiving means on the other object. If it is assumed that each of the electromagnetic waves is transmitted at a level S, received at a level R, the two objects are spaced from each other by a distance L, and each of the electromagnetic waves has an attenuation factor $\alpha$ per unit distance, then the level R at which each of the electromagnetic waves is received is generally given by the following equation:

$$R = S \cdot \exp(-\alpha \cdot L). \tag{1}$$

The attenuation factor $\alpha$ in the ordinary atmosphere generally varies from wavelength to wavelength, and tends to be inherent in each wavelength. When one of the objects is laterally displaced or changes its orientation with respect to the other object, the level R varies even if the distance L remains unchanged. With transmission antennas being appropriately designed, the levels R of the respective electromagnetic waves vary to the same extent as each other, and hence the ratio of the levels R is not susceptible to a lateral displacement or orientational change of one of the objects with respect to the other object. If the ratio of the levels S of one set of electromagnetic waves is preset, then the ratio of the levels R of the set of electromagnetic waves, which is detected by the distance detecting means, corresponds to the distance L between the two objects regardless of a lateral displacement or orientational change of one of the objects with respect to the other object. Accordingly, it is possible to determine the distance L between the two objects based on the ratio of the levels R.

Specifically, the distance between the two objects can be determined according to the following equation:

$$L = \frac{1}{(\alpha_2 - \alpha_1)} \log_e \left( \frac{R_1}{R_2} \cdot \frac{S_2}{S_1} \right) \tag{2}$$

where L represents the distance between the two objects, $S_1$, $S_2$ represent the levels at which the at least one set of electromagnetic waves is transmitted by the transmitting means, $R_1$, $R_2$ represent the levels at which the at least one set of electromagnetic waves is received by the receiving means, and $\alpha_1$, $\alpha_2$ represent attenuation factors per unit distance of the at least one set of electromagnetic waves between the two objects.

Therefore, if the ratio ($S_2/S_1$) of the levels $S_1$, $S_2$ and the attenuation factors $\alpha_1$, $\alpha_2$ inherent in the wavelengths of the electromagnetic waves are given, then the distance L between the two objects can be determined from the ratio ($R_1/R_2$) of the levels $R_1$, $R_2$ when they are detected. Since each of the electromagnetic waves has a constant wavelength, signals representing the received electromagnetic waves can easily and reliably be extracted using bandpass filters and amplifiers, and hence the levels at which the electromagnetic waves transmitted by the transmitting means are received by the receiving means can be detected. Consequently, the distance between the two objects can be determined according to the equation (2) above. Appropriate levels for transmitting the electromagnetic waves can be selected simply by setting the ratio ($S_2/S_1$) thereof. For determining the distance L between the two objects according to the equation (2), it is preferable to use electromagnetic waves having such wavelengths that the difference between their attenuation factors $\alpha_1$, $\alpha_2$ is relatively large. Using such electromagnetic waves, it is possible to increase the accuracy with which to determine the distance L between the two objects. If the correlation between ratios ($R_1/R_2$) of the levels $R_1$, $R_2$ at which the electromagnetic waves are received and distances L has been given in a data map or the like, then the distance L can directly be determined from the ratio ($R_1/R_2$) of the detected levels $R_1$, $R_2$ without calculating the equation (2).

The attenuation factors $\alpha_1$, $\alpha_2$ of the set of electromagnetic waves tends to vary depending on a climatic condition such as an amount of rain or fog, causing the ratio of the levels of the received electromagnetic waves to vary even if the distance L remains the same. The distance L can be determined taking the climatic condition into account by correcting the attenuation factors $\alpha_1$, $\alpha_2$ or a difference ($\alpha_2-\alpha_1$) between the attenuation factors $\alpha_1$, $\alpha_2$ depending on the climatic condition.

Alternatively, attenuation factors in the ordinary atmosphere may be used as the attenuation factors $\alpha_1$, $\alpha_2$ of the set of electromagnetic waves, and the distance L determined according to the equation (2) may be corrected depending on the climatic condition.

The attenuation factors $\alpha_1$, $\alpha_2$ in the equation (2), or the difference ($\alpha_2-\alpha_1$) between the attenuation factors $\alpha_1$, $\alpha_2$, or the distance determined according to the equation (2) should preferably be corrected depending on an amount of rain and/or fog.

A climatic condition such as an amount of rain or fog can be detected by emitting light into the atmosphere and receiving light reflected by droplets of a rain and/or fog which is present in the atmosphere. The amount of rain or fog can be detected based on the level or the like of the received light.

The distance measuring system may further comprise transmitting and receiving means for transmitting and receiving a plurality of electromagnetic waves having the same wavelengths as those of the electromagnetic waves at a given distance, and attenuation factor detecting means for detecting the attenuation factors of the electromagnetic waves based on levels at which the electromagnetic waves are transmitted and received by the transmitting and receiving means. The detected attenuation factors may be used as the attenuation factors $\alpha_1$, $\alpha_2$ in the equation (2) for determining the distance L between the two objects accurately irrespective of the climatic condition.

The distance detecting means may determine a plurality of values of the distance between the two objects based on ratios of the levels at which at least two sets of electromagnetic waves are received by the receiving means, and average the determined values into the distance between the two objects. In this manner, the distance between the two objects can be determined with higher accuracy.

Each of the electromagnetic waves should preferably belong to a frequency band from microwave to submillimeter ranges (whose wavelengths range from 0.5 mm to 20 mm) or a frequency band of infrared radiations (whose wavelengths range from 0.7 μm to 20 μm). This range is preferred because the attenuation factor is apt to differ relatively widely depending on the wavelength of the electromagnetic wave.

The transmitting means, the receiving means, and the distance detecting means may be mounted on each of the objects.

The transmitting and receiving means and the attenuation factor detecting means are mounted on the object on which the receiving means is mounted.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

First, a distance measuring system according to a first embodiment of the present invention will be described below with reference to FIGS. 1 and 2.

Figure 1:
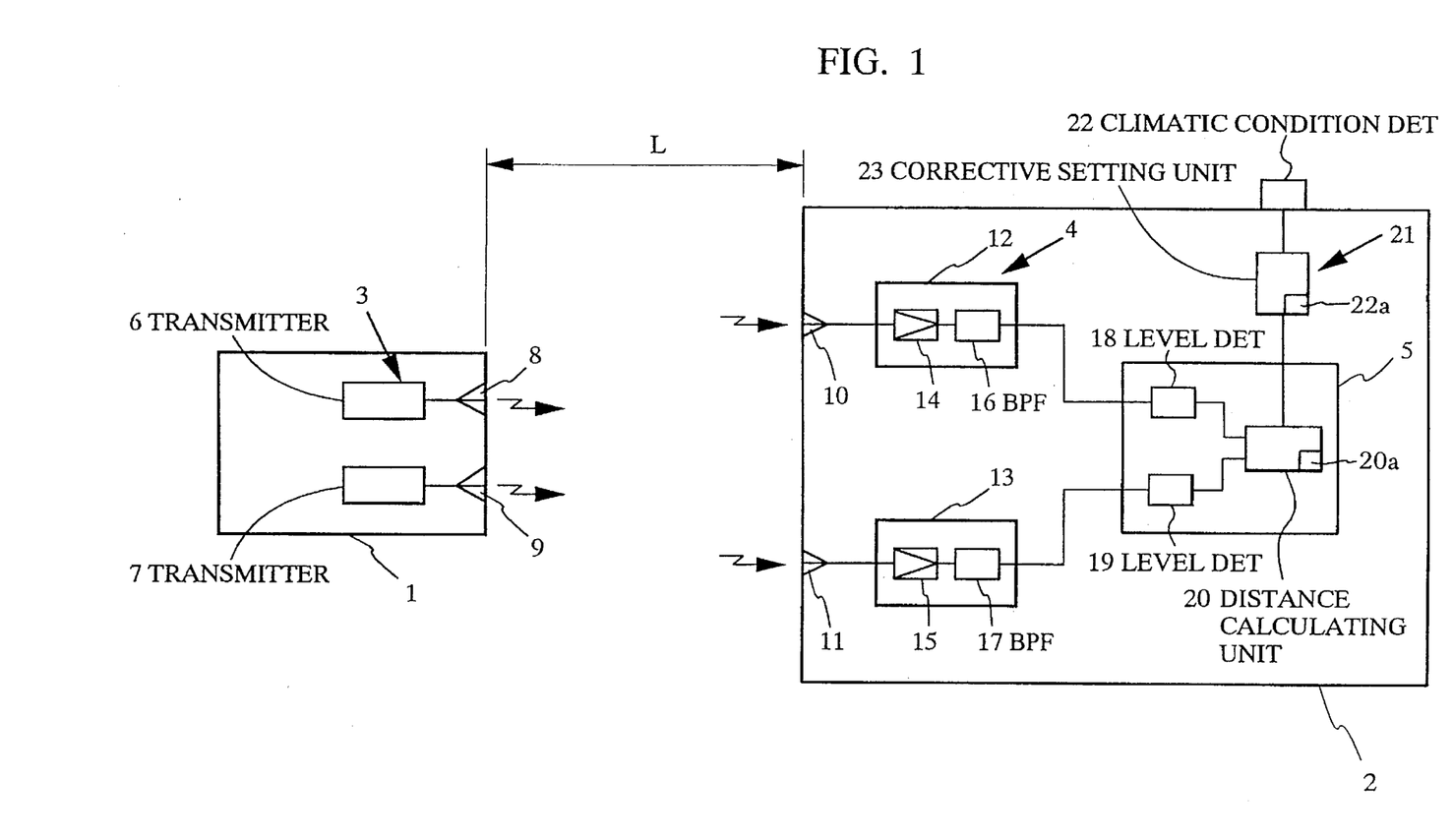
FIG. 1 is a block diagram of a distance measuring system according to a first embodiment of the present invention.

As shown in FIG. 1, the distance measuring system according to the first embodiment, for measuring the distance L between objects 1, 2, comprises a transmitter assembly 3 mounted on the object 1 for transmitting an electromagnetic wave, a receiver 4 mounted on the object 2 for receiving an electromagnetic wave, and a distance detector 5 mounted on the object 2. The objects 1, 2 may be automobiles, respectively, running successively on the road, or the object 1 may be an object carried by a pedestrian or an object placed on the road and the object 2 may be an automobile. Basically, the objects 1, 2 may be any desired objects which are spaced from each other by the distance L that is to be measured.

The transmitter assembly 3 comprises a pair of transmitters 6, 7 carried by the object 1, and a pair of antennas 8, 9 responsive to transmission signals from the respective transmitters 6, 7 for transmitting electromagnetic waves. The transmitters 6, 7 generate respective transmission signals of constant frequencies which differ from each other, and supply the generated transmission signals to the antennas 8, 9, respectively. For example, the frequencies of the transmission signals generated by the respective transmitters 6, 7 may be 30 GHz and 60 GHz, respectively. The transmission signals generated by the respective transmitters 6, 7 have respective levels that are held at a predetermined constant ratio. In response to the transmission signals from the respective transmitters 6, 7, the antennas 8, 9 transmit respective electromagnetic waves of constant wavelengths that differ from each other (of frequencies of 30 GHz and 60 GHz, respectively) at a given ratio. The antennas 8, 9 direct their electromagnetic waves toward the object 2. If the objects 1, 2 are automobiles, respectively, running successively on the road, then the antennas 8, 9 on the object 1 (automobile) running ahead of the object 2 (automobile) direct their electromagnetic waves rearwardly toward the object 2.

The receiver assembly 4 comprises a pair of antennas 10, 11 for receiving the electromagnetic waves of 30 GHz and 60 GHz that have been transmitted from the respective antennas 8, 9, and a pair of receivers 12, 13 for generating respective received signals representative of the received electromagnetic waves from signals that are outputted from the antennas 10, 11. The receivers 12, 13 have respective amplifiers 14, 15 and respective bandpass filters 16, 17. The amplifiers 14, 15 amplify the signals that are outputted from the antennas 10, 11 up to a necessary level with respective amplification factors, and the bandpass filters 16, 17 extract frequency components of 30 GHz and 60 GHz, respectively, from the amplified signals. The receivers 12, 13, therefore, generate and output received signals at levels corresponding to the levels of the received electromagnetic waves. In the illustrated embodiment, the amplification factors of the amplifiers 14, 15 are identical to each other.

The distance detector 5 comprises a pair of level detectors 18, 19 for detecting the levels of received signals outputted respectively from the receivers 12, 13, and a distance calculating unit 20 for determining the distance L between the objects 1, 2 from the levels of received signals detected by the level detectors 18, 19 according to the equation (2), given below. The level detectors 18, 19 may comprise peak-hold circuits or the like, for example, and the distance calculating unit 20 may comprise a microcomputer, for example, calculating the distance L through the following equation (2):

$$L = \frac{1}{(\alpha_2 - \alpha_1)} \log_e \left( \frac{R_1}{R_2} \cdot \frac{S_2}{S_1} \right). \quad (2)$$

The distance calculating unit 20 stores in a memory 20a the values of attenuation factors $\alpha_1$, $\alpha_2$ per unit distance of the electromagnetic waves of 30 GHz and 60 GHz in an ordinary atmosphere, i.e., an atmosphere free of a rain and/or fog, and a ratio ($S_2/S_1$) of the levels of the electromagnetic waves transmitted from the antennas 8, 9 on the object 1.

Figure 2:
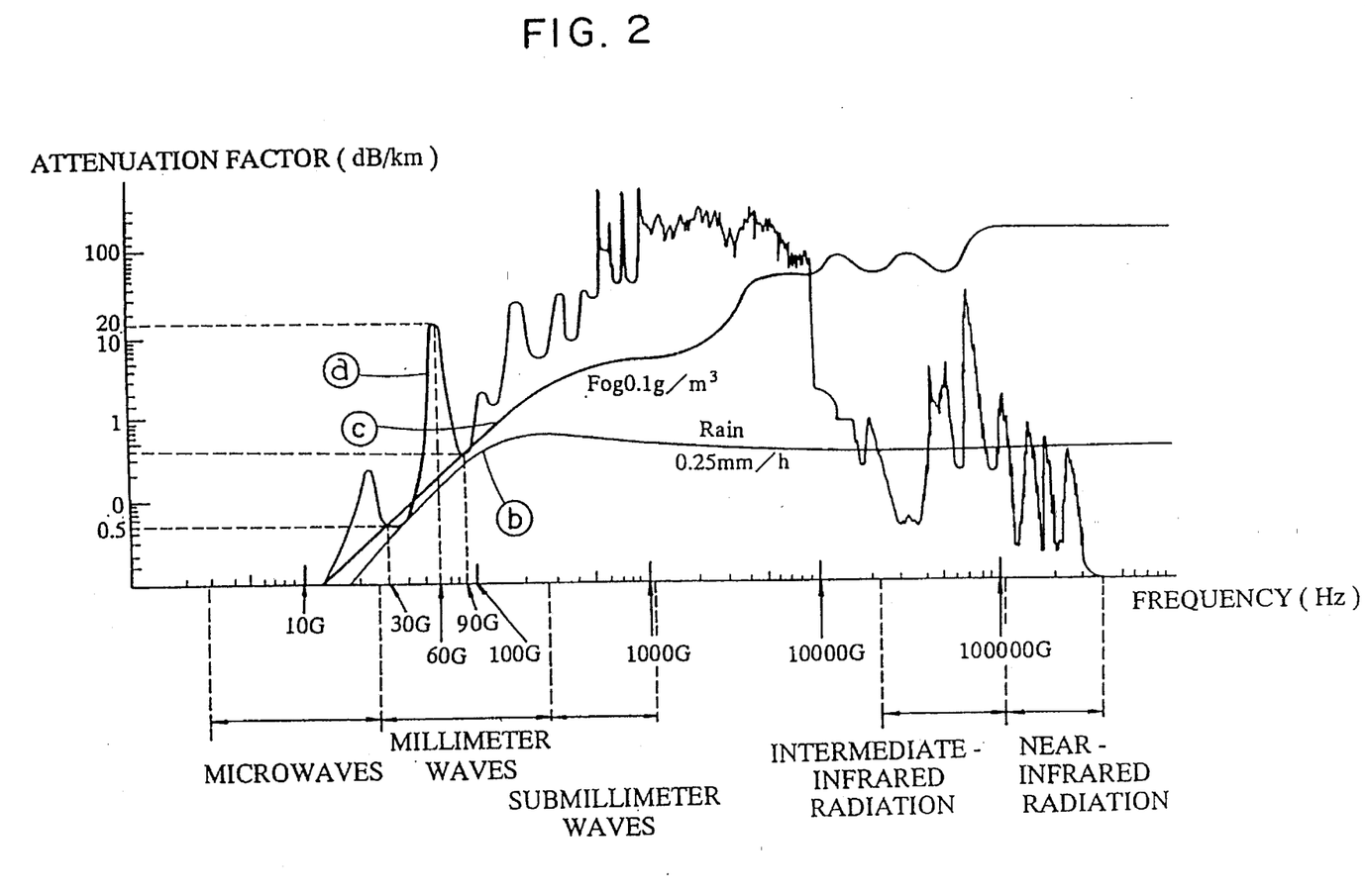
FIG. 2 is a diagram illustrative of operation of the distance measuring system shown in FIG. 1.

FIG. 2 shows a curve (a) representing actual attenuation factors in the ordinary atmosphere of electromagnetic waves at various frequencies. As can be seen from the curve (a), the attenuation factor varies depending on the frequency of the electromagnetic wave (the wavelength of the electromagnetic wave). The attenuation factors of electromagnetic waves at various frequencies tend to be inherent in those frequencies (wavelengths). Particularly, the attenuation factor tends to vary greatly depending on the wavelength of the electromagnetic wave in a frequency band from microwave to submillimeter wave ranges and a frequency band from intermediate-to near-infrared ranges. For example, the frequencies of 30 GHz and 60 GHz of the electromagnetic waves used in the present embodiment belong to the frequency band from microwave to submillimeter wave ranges, and the attenuation factors $\alpha_1$, $\alpha_2$ of the respective electromagnetic waves of 30 GHz and 60 GHz are about 0.5 and 20 dB/km, respectively, which differ relatively widely from each other. These frequencies of 30 GHz and 60 GHz of the electromagnetic waves used in the present embodiment have been selected to give attenuation factors $\alpha_1$, $\alpha_2$ which differ relatively widely from each other. In FIG. 2, the frequencies are represented by a horizontal axis with logarithmic indications, and the attenuation factors are represented by a vertical axis with logarithmic indications.

As shown in FIG. 1, a corrector 21 is carried by the object 2 for correcting the values of attenuation factors $\alpha_1$, $\alpha_2$ in the equation (2) depending on climatic conditions including an amount of rain, an amount of fog, or the like. The corrector 21 comprises a climatic condition detector 22 for detecting an amount of rain, an amount of fog, or the like, and a corrective setting unit 23 for establishing corrective setpoints for the attenuation factors $\alpha_1$, $\alpha_2$ in the distance calculating unit 20 depending on the amount of rain, the amount of fog, or the like detected by the climatic condition detector 22.

The climatic condition detector 22 relies on light to detect an amount of rain, an amount of fog, or the like. Specifically, the climatic condition detector 22 emits light into the atmosphere and receives light reflected by droplets of a rain and/or fog which may be present in the atmosphere. The climatic condition detector 22 detects an amount of rain or an amount of fog based on the level or the like of the received light. An amount of rain may alternatively be detected by a conventional rain gage.

The corrective setting unit 23 stores in a memory 22a a data map or a table map representing corrective setpoints for various values of attenuation factors $\alpha_1$, $\alpha_2$ corresponding to various amounts of rain and/or fog. The corrective setting unit 23 determines corrective setpoints for the attenuation factors $\alpha_1$, $\alpha_2$ corresponding to the amount of rain and/or fog which has been detected by the climatic condition detector 22 based on the data map or the table map, and establishes the corrective setpoints in the distance calculating unit 20.

In FIG. 2, a curve (b) represents attenuation factors of electromagnetic waves at various frequencies with a rainfall at a rate of 0.25 mm/h, for example, and a curve (c) represents attenuation factors of electromagnetic waves at various frequencies when a fog occurs at a rate of 0.1 g/m³, for example. The attenuation factor of an electromagnetic wave increases during a rainfall or when a fog occurs. When a rain falls at a rate of 0.25 mm/h or a fog occurs at a rate of 0.1 g/m³ the actual attenuation factors of electromagnetic waves at various frequencies are given as the sums of values of attenuation factors given by the curve (a) and values of attenuation factors given by the curve (b) or (c).

In this embodiment, increases in the attenuation factors as shown by the curves (b), (c) are determined for various amounts of rain and fog by experimentation or the like at the frequencies of 30 GHz and 60 GHz of the electromagnetic waves used, and stored as data of corrective setpoints (increases in the attenuation factors) in the memory of the corrective setting unit 23. Increases in the attenuation factors due to a rain and/or fog tend to be greater as the amount of rain and/or fog increases.

Operation of the distance measuring system according to the first embodiment will be described below.

The transmitters 6, 7 on the object 1 generate respective transmission signals of 30 GHz and 60 GHz, and apply the generated transmission signals to the respective antennas 8, 9, from which electromagnetic waves of 30 GHz and 60 GHz are transmitted toward the object 2. The transmitted electromagnetic waves are propagated through the atmosphere and received by the antennas 10, 11 on the object 2.

When the antennas 10, 11 receive the electromagnetic waves, they output signals to the respective receivers 12, 13. The amplifiers 14, 15 of the receivers 12, 13 amplify the signals at the same amplification factor, and the bandpass filters 16, 17 extract frequency components of 30 GHz and 60 GHz from the amplified signals. The receivers 12, 13 now generate received signals having levels corresponding to the received levels of the electromagnetic waves transmitted from the transmitter 3 on the object 1.

The received signals generated by the respective receivers 12, 13 and representing the electromagnetic waves of 30 GHz and 60 GHz are outputted to the respective level detectors 18, 19 of the distance detector 5. The level detectors 18, 19 detect the respective levels of the received signals, i.e., the received levels $R_1$, $R_2$ of the electromagnetic waves.

The distance calculating unit 20 then determines a ratio $(R_1/R_2)$ from the received levels $R_1$, $R_2$ of the electromagnetic waves which have been detected by the level detectors 18, 19, and determines the distance L between the objects 1, 2 according to the equation (2).

If the present weather is free of a rain and/or fog, then the corrective setting unit 23 of the corrector 21 establishes a corrective setpoint "0" for the attenuation factors $\alpha_1$, $\alpha_2$. In such a case, the distance calculating unit 20 determines the distance L between the objects 1, 2 according to the equation (2) from the ratio $(R_1/R_2)$ from the received levels $R_1$, $R_2$ which have been detected, a predetermined ratio $(S_2/S_1)$ of the transmitted levels of the electromagnetic waves, and predetermined values of attenuation factors $\alpha_1$, $\alpha_2$ of the electromagnetic waves of 30 GHz and 60 GHz which are given according to the curve (a) in FIG. 2.

In the event that one of the objects 1, 2 is laterally displaced or changes its orientation with respect to the other in the direction in which the electromagnetic waves are transmitted, the received levels $R_1$, $R_2$ of the electromagnetic waves may be varied. However, the received levels $R_1$, $R_2$ of the electromagnetic waves vary to substantially the same extent. Therefore, the ratio $(R_1/R_2)$ of the received levels $R_1$, $R_2$ of the electromagnetic waves remains substantially unchanged. The antennas 10, 11 on the object 2 receive not only the electromagnetic waves which have been propagated through the atmosphere directly from the object 1 to the object 2, but also indirect electromagnetic waves which have been reflected via other objects. Inasmuch the levels of such indirect electromagnetic waves are small as compared with the levels of the directly received electromagnetic waves, the ratio $(R_1/R_2)$ of the received levels $R_1$, $R_2$ represents the ratio of the levels of the directly received electromagnetic waves of 30 GHz and 60 GHz.

Consequently, the distance L between the objects 1, 2 which is determined according to the equation (2) is detected highly accurately regardless of any possible lateral displacements or orientational changes of the objects 1, 2 and any indirectly received electromagnetic waves.

If it is raining or a fog is occurring, then the amount of rain and/or fog is detected by the climatic condition detector 22, and the corrective setting unit 23 establishes corrective setpoints for the attenuation factors $\alpha_1$, $\alpha_2$ in the distance calculating unit 20 depending on the detected amount of rain and/or fog based on the stored map or table data. At this time, the distance calculating unit 20 adds the corrective setpoints established by the corrective setting unit 23 to the values of attenuation factors $\alpha_1$, $\alpha_2$ in the ordinary atmosphere, thereby producing attenuation factors $\alpha_1$, $\alpha_2$ under the present climatic condition, and determines the distance L between the objects 1, 2 using the produced attenuation factors $\alpha_1$, $\alpha_2$ according to the equation (2). Accordingly, the distance detector can determine the distance L between the objects 1, 2 with good accuracy under various climatic conditions.

The attenuation factors $\alpha_1$, $\alpha_2$ may be corrected in any of various other fashion described below. The corrective setting unit 23 may establish a corrective setpoint for the difference between the attenuation factors $\alpha_1$, $\alpha_2$, and the distance calculating unit 20 may correct the difference $(\alpha_1-\alpha_2)$ between the attenuation factors $\alpha_1$, $\alpha_2$ in the equation (2). Alternatively, the corrective setting unit 23 may establish a corrective coefficient by which to multiply attenuation factors $\alpha_1$, $\alpha_2$ or the difference $(\alpha_1-\alpha_2)$ therebetween, depending on the climatic condition, and the distance calculating unit 20 may correct the attenuation factors $\alpha_1$, $\alpha_2$ or the difference $(\alpha_1-\alpha_2)$ by multiplying the attenuation factors $\alpha_1$, $\alpha_2$ in the ordinary atmosphere or the difference $(\alpha_1-\alpha_2)$ by the established corrective coefficient. The equation (2) may be calculated using the values of attenuation factors $\alpha_1$, $\alpha_2$ in the ordinary atmosphere, and the determined distance may be corrected based on corrective setpoints for the attenuation factors $\alpha_1$, $\alpha_2$ which have been established by the corrective setting unit 23, thereby determining the distance L.

The detected distance L may be employed for effecting an automatic control process, such as an automatic braking process, for automobiles, or an alarm control process for automobiles.

As described above, since the distance L between the objects 1, 2 is determined according to the equation (2) from the ratio $(R_1/R_2)$ of the received levels $R_1$, $R_2$ of electromagnetic waves having different attenuation factors $\alpha_1$, $\alpha_2$ (different wavelengths), the distance L can be determined regardless of any possible lateral displacements or orientational changes of the objects 1, 2 and any indirectly received electromagnetic waves. Therefore, the distance measuring system according to this embodiment can increase the reliability of detection of the distance L. Because only the ratio of transmitted levels $S_1$, $S_2$ of electromagnetic waves is required to be established with respect to those transmitted levels $S_1$, $S_2$, appropriate transmitted levels may be established depending on the distance L to be detected, and also depending on the climatic condition. For example, the transmitted levels may be increased under those climatic conditions which are liable to attenuate the electromagnetic waves. The calculation to determine the distance L can be carried out highly accurately by using the electromagnetic waves of 30 GHz and 60 GHz whose attenuation factors $\alpha_1$, $\alpha_2$ differ relatively widely from each other. The distance L between the objects 1, 2 can be detected by transmitting electromagnetic waves of constant wavelengths from the object 1, receiving the transmitted electromagnetic waves with the object 2, detecting the received levels of the electromagnetic waves using a simple circuit composed of the amplifiers 14, 15, the filters 16, 17, and the level detectors 18, 19, and calculating the distance L according to the equation (2). Consequently, the structural arrangement of the distance measuring system may be highly simple and inexpensive.

Furthermore, inasmuch as the attenuation factors $\alpha_1$, $\alpha_2$ or the difference therebetween is corrected depending on the climatic condition such as a rain and/or fog, the distance L can well be detected under various climatic conditions.

The distance measuring system according to the first embodiment may be modified as follows:

In the first embodiment which is illustrated, the distance L between the objects 1, 2 is detected using the electromagnetic waves of 30 GHz and 60 GHz. However, the distance L between the objects 1, 2 may be detected using electromagnetic waves having any desired wavelengths whose attenuation factors differ relatively widely from each other. Such electromagnetic waves that can be used preferably belong to a frequency band from microwave to submillimeter wave ranges (whose wavelengths range from 0.5 mm to 20 mm) and a frequency band from intermediate- to near-infrared ranges (whose wavelengths range from 0.7 μm to 20 μm), as can be seen from FIG. 2. The frequency band from microwave to submillimeter wave ranges is particularly preferable because any increase in the attenuation factor due to a rain, fog, or the like is relatively small. The frequency band from intermediate- to near-infrared ranges may also be used without fail for the detection of the distance between objects in conditions free of a rain and/or fog, such as the distance between objects located indoors.

In the above embodiment, two electromagnetic waves are transmitted using the respective transmitters 6, 7 and received using the respective receivers 12, 13. However, electromagnetic waves having plural frequencies may be successively transmitted and received using transmitters capable of generating transmission signals representing electromagnetic waves having plural frequencies and receivers capable of receiving signals representing such electromagnetic waves having plural frequencies.

Rather than determining the distance L according to the equation (2), a data map of distances L corresponding to various ratios ($R_1/R_2$) of received levels may be stored, and a distance L may be determined directly from a ratio ($R_1/R_2$) of detected levels based on the data of the data map.

While the transmitter assembly 3 is carried on only the object 1 and the receiver assembly 4 and the distance detector 5 are carried on only the object 2 in the above illustrated embodiment, the transmitter assembly 3, the receiver assembly 4, the distance detector 5 may be carried on each of the objects 1, 2 to allow the distance L to be detected on each of the objects 1, 2.

In the above illustrated embodiment, the distance calculating unit 20 for calculating the equation (2) is in the form of a microcomputer. However, the equation (2) may be calculated by a logarithmic converter which comprises operational amplifiers.

The amplifiers 14, 15 of the receivers 12, 15 have the same amplification factor in the above illustrated embodiment. However, the amplifiers 14, 15 may have different amplification factors for different electromagnetic waves. According to such a modification, if it is assumed that the signal levels detected respectively by the level detectors 18, 19 are represented by $L_1$, $L_2$, respectively, and the amplification factors of the amplifiers 14, 15 are represented by $G_1$, $G_2$, respectively, then the ratio ($R_1/R_2$) of received levels in the equation (2) are produced by multiplying the ratio ($L_1/L_2$) of the signal levels by the ratio ($G_1/G_2$) of the amplification factors.

Figure 3:
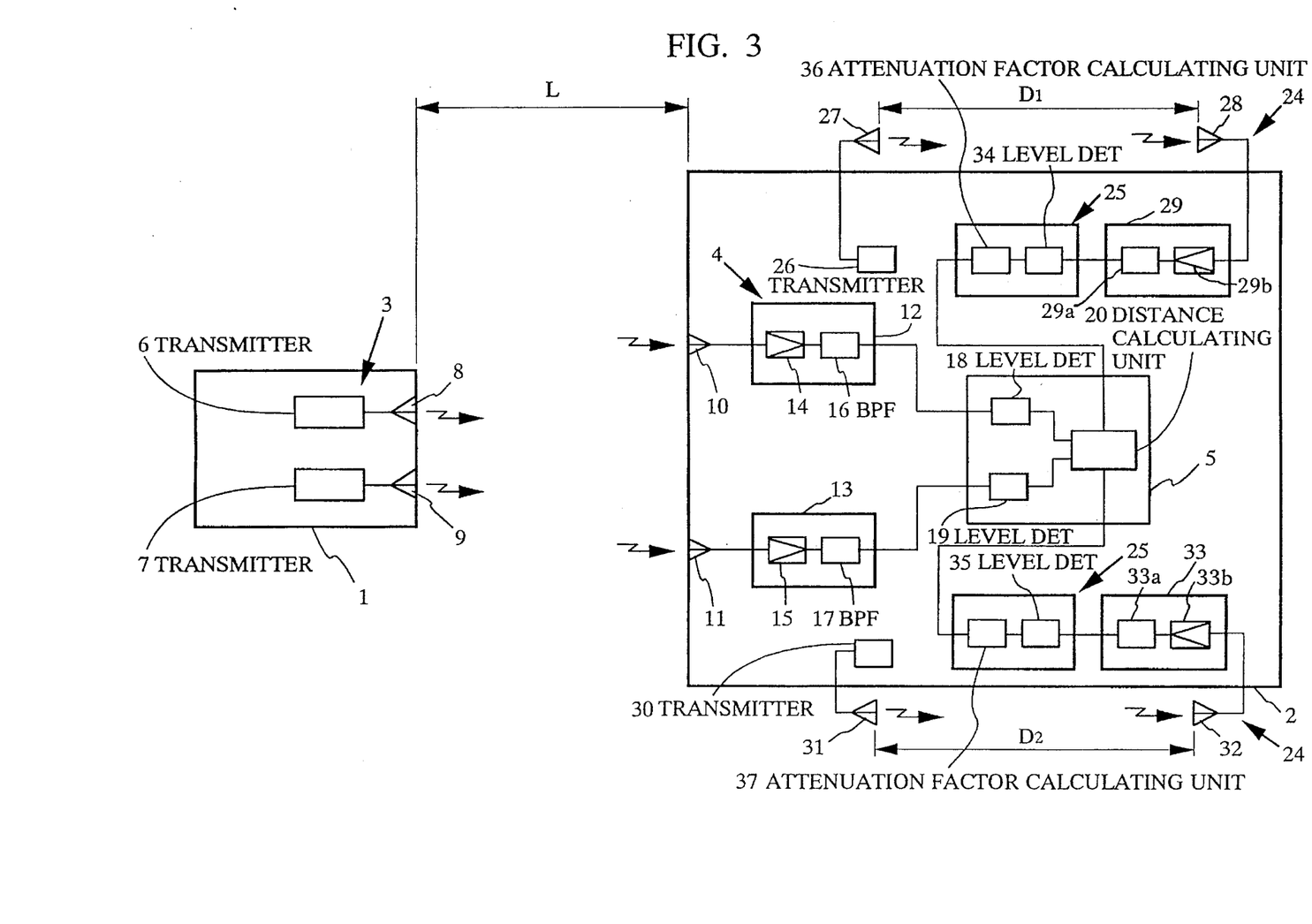
FIG. 3 is a block diagram of a distance measuring system according to a second embodiment of the present invention.

A distance measuring system according to a second embodiment of the present invention will be described below with reference to FIG. 3. Those parts shown in FIG. 3 which are identical to those shown in FIG. 1 are denoted by identical reference numerals, and will not be described in detail below.

The distance measuring system according to the second embodiment has a basic arrangement which is essentially the same as that of the distance measuring system according to the first embodiment. Specifically, as shown in FIG. 3, a transmitter assembly 3 is carried on an object 1, and a receiver assembly 4 and a distance detector 5 are carried on an object 2. The transmitter assembly 3 and the receiver assembly 4 shown in FIG. 3 are identical to those shown in FIG. 1, and transmit and receive electromagnetic waves of 30 GHz and 60 GHz. The distance detector 5 shown in FIG. 3 has level detectors 18, 19, which are identical to those shown in FIG. 1, and a distance calculating unit 20 for determining the distance L between the objects 1, 2 according to the equation (2) given above. The distance calculating unit 20 calculates the equation (2) using values of attenuation factors $\alpha_1$, $\alpha_2$ per unit distance of electromagnetic waves of 30 GHz and 60 GHz, which are established by an attenuation factor setting unit (described later on).

According to the second embodiment, the object 2 additionally carries a transmitter and receiver assembly 24 for transmitting and receiving electromagnetic waves of 30 GHz and 60 GHz at a given distance, and an attenuation factor detecting unit 25 for detecting attenuation factors $\alpha_1$, $\alpha_2$ of electromagnetic waves based on the electromagnetic waves transmitted and received by the transmitter and receiver assembly 24, and establishing the detected values of attenuation factors $\alpha_1$, $\alpha_2$ in the distance calculating unit 20.

The transmitter and receiver assembly 24 comprises a transmitter 26 and an antenna 27 connected thereto for transmitting an electromagnetic wave of 30 GHz, an antenna 28 and a receiver assembly 29 connected thereto for receiving the transmitted electromagnetic wave of 30 GHz, a transmitter 30 and an antenna 31 connected thereto for transmitting an electromagnetic wave of 60 GHz, an antenna 32 and a receiver assembly 33 connected thereto for receiving the transmitted electromagnetic wave of 60 GHz. The receiver assembly 29 includes a amplifier 29a and a band pass filter 29b and the receiver assembly 33 includes an amplifier 33a and a band pass filter 33b. The antennas 27, 28 for transmitting and receiving the electromagnetic wave of 30 GHz are fixedly mounted on the object 2 in confronting relation to each other and spaced a distance $D_1$ from each other. In response to a signal supplied from the transmitter 26, the antenna 27 transmits the electromagnetic wave of 30 GHz toward the antenna 28. Similarly, the antennas 31, 32 for transmitting and receiving the electromagnetic wave of 60 GHz are fixedly mounted on the object 2 in confronting relation to each other and spaced a distance D2 (which may be equal to the distance $D_1$) from each other. In response to a signal supplied from the transmitter 30, the antenna 31 transmits the electromagnetic wave of 60 GHz toward the antenna 32. The receivers 29, 33 generate respective;received signals having levels which correspond to the levels of the electromagnetic waves of 30 GHz and 60 GHz which have been received by the respective antennas 28, 32.

The attenuation factor detecting unit 25 comprises level detectors 34, 35 for detecting the levels of received signals outputted from the receivers 29, 33, and attenuation factor calculating units 36, 37 for determining actual attenuation factors $\alpha_1$, $\alpha_2$ of electromagnetic waves of 30 GHz and 60 GHz from the levels of received signals detected by the level detectors 34, 35, the levels of transmitted electromagnetic waves which have been predetermined in the transmitter and receiver assembly 24, the distance D1 between the antennas 27, 28, and the distance $D_2$ between the antennas 31, 32, and establishing the determined actual attenuation factors $\alpha_1$, $\alpha_2$ in the distance calculating unit 20.

If it is assumed that the levels of transmitted electromagnetic waves in the transmitter and receiver assembly 24 are represented by $S_3$, $S_4$, respectively, and the levels of received signals in the transmitter and receiver assembly 24 are represented by $R_3$, $R_4$, respectively, then, as is apparent from the above equation (1), the attenuation factors $\alpha_1$, $\alpha_2$ of the electromagnetic waves are determined according to the following equations (3), (4), respectively:

$$\alpha_1 = -(1/D_1) \cdot \log_e(R_3/S_3), \quad (3)$$

$$\alpha_2 = -(1/D_2) \cdot \log_e(R_4/S_4). \quad (4)$$

The attenuation factor calculating units 36, 37 determine the attenuation factors $\alpha_1$, $\alpha_2$ of the electromagnetic waves according to the equations (3), (4) from the ratios ($R_3/S_3$), ($R_4/S_4$) of the levels which are detected by the level detectors 34, 35, and establish the determined attenuation factors $\alpha_1$, $\alpha_2$ in the distance calculating unit 20 for use as attenuation factors $\alpha_1$, $\alpha_2$ in the equation (2).

The attenuation factors $\alpha_1$, $\alpha_2$ may be determined directly from the detected levels $R_3$, $R_4$ of received signals using predetermined map data.

The distance measuring system according to the second embodiment operates as follows:

Electromagnetic waves of 30 GHz and 60 GHz are transmitted by the transmitter assembly 3 on the object 1 and received by the receiver assembly 4 on the object 2. At this time, the level detectors 18, 19 of the distance detector 5 detect levels $R_1$, $R_2$ of the received electromagnetic waves, and send the detected levels $R_1$, $R_2$ to the distance calculating unit 20.

At the same time, the transmitter and receiver assembly 24 on the object 2 transmits and receives electromagnetic waves of 30 GHz and 60 GHz between the antennas 27, 28 and between the antennas 31, 32. At this time, the attenuation factor calculating units 36, 37 determine present attenuation factors $\alpha_1$, $\alpha_2$, respectively, of the electromagnetic waves of 30 GHz and 60 GHz according to the equations (3), (4) based on levels $R_3$, $R_4$ of received signals which are detected by the level detectors 34, 35, respectively. The attenuation factor calculating units 36, 37 then establish the determined values of attenuation factors $\alpha_1$, $\alpha_2$ in the distance calculating unit 20, which then determines the distance L between the objects 1, 2 according to the equation (2) based on the established values of attenuation factors $\alpha_1$, $\alpha_2$.

The attenuation factors $\alpha_1$, $\alpha_2$ established respectively by the attenuation factor calculating units 36, 37 represent actual attenuation factors that have been affected by the climatic condition such as a rain and/or fog. Therefore, the distance detector 5 can detect the distance L with good accuracy irrespective of the climatic condition such as a rain and/or fog.

The distance measuring system according to the second embodiment may be modified in the same manner as described above with respect to the distance measuring system according to the first embodiment.

A distance measuring system according to a third embodiment of the present invention will be described below with reference to FIG. 4. Those parts shown in FIG. 4 which are identical to those shown in FIG. 1 are denoted by identical reference numerals, and will not be described in detail below.

The distance measuring system according to the third embodiment has a basic arrangement which is essentially the same as that of the distance measuring system according to the first embodiment. Specifically, as shown in FIG. 4, a transmitter assembly 3 is carried on an object 1, and a receiver assembly 4, a distance detector 5, and a corrector 21 are carried on an object 2.

The transmitter assembly 3 comprises transmitters 6, 7 and antennas 8, 9, which are identical to those shown in FIG. 1, for transmitting electromagnetic waves of 30 GHz and 60 GHz, and also a transmitter 38 and an antenna 39 for transmitting an electromagnetic wave of 90 GHz, for example. The transmitter 38 and the antenna 39 transmit an electromagnetic wave of 90 GHz toward the object 2. As shown in FIG. 2, the electromagnetic wave of 90 GHz has an attenuation factor in the ordinary atmosphere which differs relatively widely from the attenuation factors of the electromagnetic waves of 30 GHz and 60 GHz.

The receiver assembly 4 comprises antennas 12, 13 and receivers 10, 11, which are identical to those shown in FIG. 1, for receiving the transmitted electromagnetic waves of 30 GHz and 60 GHz, and also an antenna 40 and a receiver 41 for receiving the transmitted electromagnetic wave of 90 GHz. The receiver 41 comprises an amplifier 42 and a bandpass filter 43.

Figure 4:
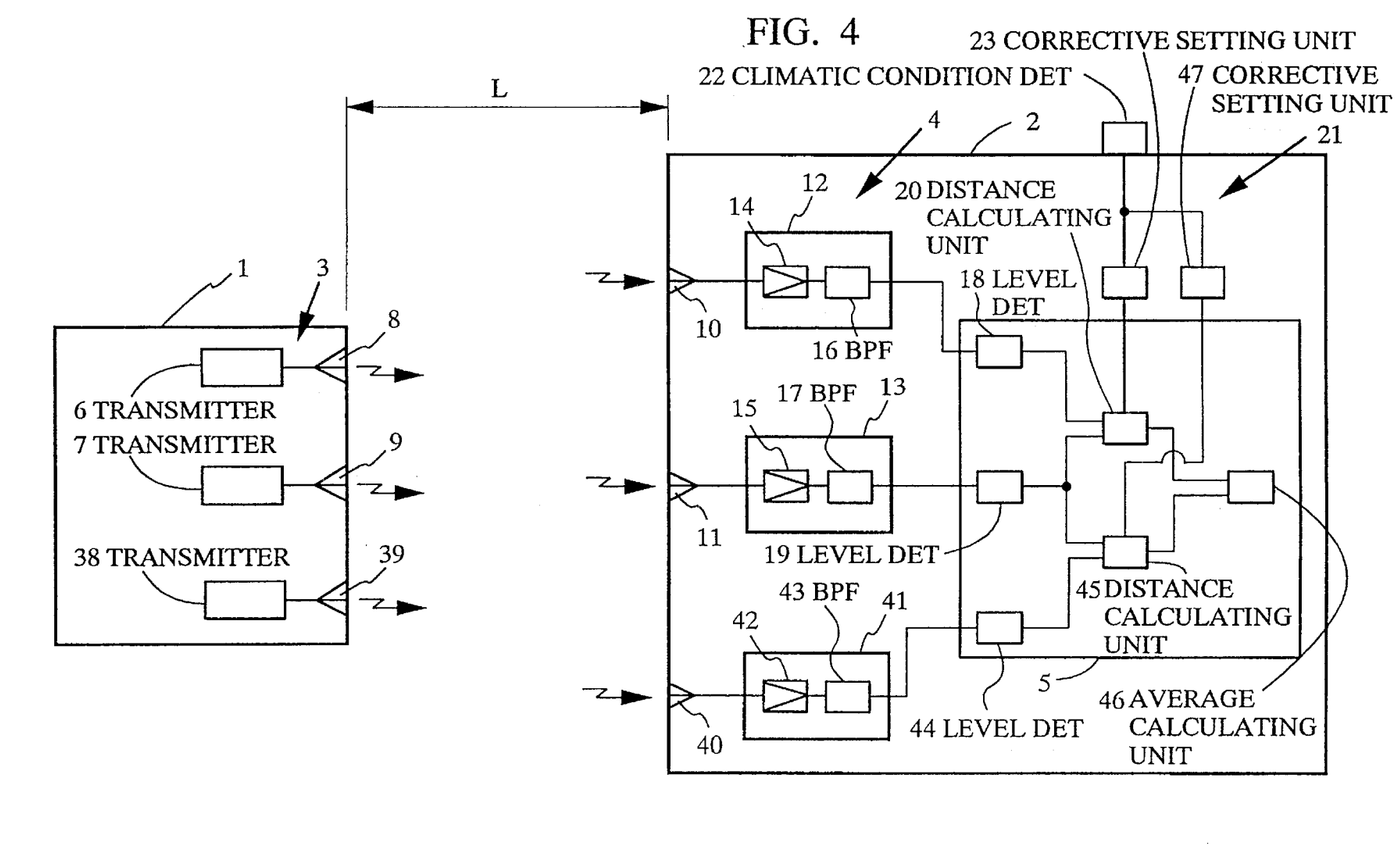
FIG. 4 is a block diagram of a distance measuring system according to a third embodiment of the present invention.

The distance detector 5 shown in FIG. 4 has level detectors 18, 19, which are identical to those shown in FIG. 1, and a distance calculating unit 20, which is identical to that shown in FIG. 1, for determining the distance L between the objects 1, 2. The distance detector 5 also includes a level detector 44 for detecting the level of a signal indicative of the received electromagnetic wave of 90 GHz from the receiver 41, a distance calculating unit 45 for determining the distance L between the objects 1, 2 according to the equation (2) from the ratio of the levels of received signals which are detected by the level detectors 19, 44 as being indicative of the electromagnetic waves of 60 GHz and 90 GHz, and an average calculating unit 46 for determining an average of the distances L determined by the distance calculating units 20, 45 as the actual distance L between the objects 1, 2.

The corrector 21 comprises a climatic condition detector 22 for detecting an amount of rain, an amount of fog, or the like, a corrective setting unit 23 for establishing corrective setpoints for the attenuation factors of the electromagnetic waves of 30 GHz and 60 GHz or a corrective setpoint for the difference between the attenuation factors in the distance calculating unit 20 depending on the amount of rain, the amount of fog, or the like detected by the climatic condition detector 22, and a corrective setting unit 47 for establishing corrective setpoints for the attenuation factors of the electromagnetic waves of 60 GHz and 90 GHz or a corrective setpoint for the difference between the attenuation factors in the distance calculating unit 45 depending on the amount of rain, the amount of fog, or the like detected by the climatic condition detector 22. The corrective setting unit 47 stores in a memory (not shown) a data map or a table map representing corrective setpoints for various values of attenuation factors of the electromagnetic waves of 60 GHz and 60 GHz corresponding to various amounts of rain and/or fog or corrective setpoints for differences between such various values of attenuation factors. The corrective setting unit 47 determines corrective setpoints for the attenuation factors corresponding to the amount of rain and/or fog which has been detected by the climatic condition detector 22, or a corrective setpoint for the difference between those attenuation factors, based on the data map or the table map, and establishes the corrective setpoints in the distance calculating unit 45.

The distance measuring system according to the third embodiment operates as follows:

Electromagnetic waves of 30 GHz, 60 GHz, 90 GHz are transmitted by the transmitter assembly 3 on the object 1 and received by the receiver assembly 4 on the object 2. At this time, the distance calculating unit 20 determines the distance L between the objects 1, 2 according to the equation (2) based on the ratio of the levels of received signals indicative of the electromagnetic waves of 30 GHz and 60 GHz, and the distance calculating unit 45 determines the distance L between the objects 1, 2 according to the equation (2) based on the ratio of the levels of received signals indicative of the electromagnetic waves of 60 GHz and 90 GHz. Each of the distance calculating units 20, 45 determines the distance L while taking into account corrective setpoints that have been established by the corrective setting units 23, 47 for the attenuation factors of the electromagnetic waves depending on an amount of rain and/or fog.

The distances L determined by the distance calculating units 20, 45 are then supplied to the average calculating unit 46, which averages the supplied distances L into the actual distance L between the objects 1, 2.

Because the actual distance L thus determined between the objects 1, 2 is an average of the distance L which has been determined using the set of electromagnetic waves of 30 GHz and 60 GHz and the distance L which has been determined using the set of electromagnetic waves of 60 GHz and 90 GHz, the actual distance L between the objects 1, 2 can be determined more accurately than it is determined using only one set of electromagnetic waves.

The distance measuring system according to the third embodiment may be modified in the same manner as described above with respect to the distance measuring system according to the first embodiment.

The distance measuring system according to the third embodiment uses the set of electromagnetic waves of 30 GHz and 60 GHz and the set of electromagnetic waves of 60 GHz and 90 GHz for determining the distance L between the objects 1, 2. However, the distance measuring system according to the third embodiment may also use the set of electromagnetic waves of 30 GHz and 90 GHz for determining the distance L between the objects 1, 2, and these determined distances may be averaged to determine the actual distance L between the objects 1, 2. More sets of electromagnetic waves may be used to determine the distance L between the objects 1, 2 with greater accuracy.

In the third embodiment, the attenuation factors of the electromagnetic waves are corrected depending on the amount of rain and/or fog which is detected by the climatic condition detector 22. However, as with the second embodiment, the attenuation factors of the electromagnetic waves may be actually measured, and the distance L between the objects 1, 2 may be determined using the measured attenuation factors.

While a plurality of values of the distances L between the objects 1, 2 are determined using a plurality of sets of electromagnetic waves and averaged into the actual distance L between the objects 1, 2 in the third embodiment, one of the sets of electromagnetic waves may be selected depending on the condition in which the electromagnetic waves are received, and the distance L between the objects 1, 2 may be determined using the selected set of electromagnetic waves in the same manner as with the first embodiment.

Although certain preferred embodiments of the present invention have been shown and described in detail, it should be understood that various changes and modifications may be made therein without departing from the scope of the appended claims.

What is claimed is:

1. A distance measuring system for measuring a distance between two objects, comprising:

transmitting means adapted to be mounted on one of the two objects, for transmitting a plurality of electromagnetic waves having respective wavelengths different from each other at respective transmit levels toward the other of the two objects;

receiving means adapted to be mounted on the other object, for receiving the electromagnetic waves transmitted from said transmitting means; and distance detecting means for detecting a ratio of detected levels at which at least one set of electromagnetic waves of said electromagnetic waves is received by said receiving means, as corresponding to a distance between the two objects, and determining the distance between the two objects from said transmit levels and said ratio of said detected levels.

2. A distance measuring system for measuring a distance between two objects, comprising:

transmitting means adapted to be mounted on one of the two objects, for transmitting a plurality of electromagnetic waves having respective wavelengths different from each other at respective levels toward the other of the two objects;

receiving means adapted to be mounted on the other object, for receiving the electromagnetic waves transmitted from said transmitting means; and distance detecting means for detecting a ratio of levels at which at least one set of electromagnetic waves of said electromagnetic waves is received by said receiving means, as corresponding to a distance between the two objects, and determining the distance between the two objects from said ratio, wherein said distance detecting means comprises means for determining the distance between the two objects according to the following equation:

$$L = \frac{1}{\alpha_2 - \alpha_1} \log_e \left( \frac{R_1}{R_2} \frac{S_2}{S_1} \right)$$

where L represents the distance between the two objects, $S_1$, $S_2$ represent the levels at which said at least one set of electromagnetic waves is transmitted by said transmitting means, $R_1$, $R_2$ represent the levels at which said at least one set of electromagnetic waves is received by said receiving means, and $\alpha_1$, $\alpha_2$ represent attenuation factors per unit distance of said at least one set of electromagnetic waves between the two objects.

3. A distance measuring system according to claim 2, further comprising correcting means for correcting said attenuation factors $\alpha_1$, $\alpha_2$ or a difference ($\alpha_2 - \alpha_1$) between the attenuation factors $\alpha_1$, $\alpha_2$ depending on a climatic condition.

4. A distance measuring system according to claim 3, wherein said correcting means comprises means for correcting said attenuation factors $\alpha_1$, $\alpha_2$ or the difference ($\alpha_2 - \alpha_1$) between the attenuation factors $\alpha_1$, $\alpha_2$ depending on at least an amount of rain and/or fog.

5. A distance measuring system according to claim 1, further comprising correcting means for correcting the distance between the two objects which has been determined by said distance detecting means.

6. A distance measuring system according to claim 5, wherein said correcting means comprises means for correcting the distance between the two objects which has been determined by said distance detecting means, depending on at least an amount of rain and/or fog.

7. A distance measuring system according to claim 2, further comprising:

transmitting and receiving means for transmitting and receiving a plurality of electromagnetic waves having the same wavelengths as those of said electromagnetic waves at a given distance; and attenuation factor detecting means for detecting the attenuation factors of the electromagnetic waves based on levels at which the electromagnetic waves are transmitted and received by said transmitting and receiving means;

said distance detecting means comprising means for determining the distance between the two objects using the attenuation factors of the electromagnetic waves which are detected by said attenuation factor detecting means.

8. A distance measuring system according to claim 7, wherein said attenuation factor detecting means comprises means for determining the attenuation factor $\alpha$ of each of the electromagnetic waves according to the following equation:

$$\alpha = -\frac{1}{D} \log_e \frac{R_3}{S_3}$$

where D represents said given distance at which the electromagnetic waves are transmitted and received by said transmitting and receiving means, $S_3$ represents a level at which each of the electromagnetic waves are transmitted by said transmitting and receiving means, and $R_3$ represents a level at which each of the electromagnetic waves are received by said transmitting and receiving means.

9. A distance measuring system according to claim 1, wherein said distance detecting means comprises means for determining a plurality of values of the distance between the two objects based on ratios of the levels at which at least two sets of electromagnetic waves of said electromagnetic waves are received by said receiving means, and averaging the determined values into the distance between the two objects.

10. A distance measuring system for measuring a distance between two objects, comprising:

transmitting means adapted to be mounted on one of the two objects, for transmitting a plurality of electromagnetic waves having respective wavelengths different from each other at respective levels toward the other of the two objects;

receiving means adapted to be mounted on the other object, for receiving the electromagnetic waves transmitted from said transmitting means; and distance detecting means for detecting a ratio of levels at which at least one set of electromagnetic waves of said electromagnetic waves is received by said receiving means, as corresponding to a distance between the two objects, and determining the distance between the two objects from said ratio, wherein each of said electromagnetic waves belongs to a frequency band whose wavelengths range from 0.5 mm to 20 mm or a frequency band whose wavelengths range from 0.7 µm to 20 µm.

11. A distance measuring system for measuring a distance between two objects, comprising:

transmitting means adapted to be mounted on one of the two objects, for transmitting a plurality of electromagnetic waves having respective wavelengths different from each other at respective levels toward the other of the two objects;

receiving means adapted to be mounted on the other object, for receiving the electromagnetic waves transmitted from said transmitting means; and distance detecting means for detecting a ratio of levels at which at least one set of electromagnetic waves of said electromagnetic waves is received by said receiving means, as corresponding to a distance between the two objects, and determining the distance between the two objects from said ratio, wherein each of said electromagnetic waves belongs to a frequency band whose wavelengths range from 0.5 mm to 20 mm.

12. A distance measuring system for measuring a distance between two objects, comprising:

transmitting means adapted to be mounted on one of the two objects, for transmitting a plurality of electromagnetic waves having respective wavelengths different from each other at respective levels toward the other of the two objects;

receiving means adapted to be mounted on the other object, for receiving the electromagnetic waves transmitted from said transmitting means; and distance detecting means for detecting a ratio of levels at which at least one set of electromagnetic waves of said electromagnetic waves is received by said receiving means, as corresponding to a distance between the two objects, and determining the distance between the two objects from said ratio, wherein each of said electromagnetic waves belongs to a frequency band whose wavelengths range from 0.7 µm to 20 µm.

13. A system for determining a distance between first and second objects comprising a transmitter assembly for transmitting a first signal at a transmit level $S_1$ and at a first frequency and a second signal at a transmit level $S_2$ and at a second frequency which is different than said first frequency, said transmitter assembly being associated with the first object;

receiver assembly associated with the second object for receiving said first and second signals from the first object;

a distance detector assembly for determining a detected level $R_1$ of said first signal and a detected level $R_2$ of said second signal which have been received and for calculating the distance between the first and second objects by using said transmit levels $S_1$, $S_2$, a ratio $R_1/R_2$ of said detected levels, and expected attenuation for said first and second signals.

14. A system between first and second objects comprising a transmitter assembly for transmitting a first signal at a first frequency and a second signal at a second frequency which is different than said first frequency, said transmitter assembly being associated with the first object;

receiver assembly associated with the second object for receiving said first and second signals from the first object;

a distance detector assembly for determining a level $R_1$ of said first signal and a level $R_2$ of said second signal which have been received and for calculating the distance between the first and second objects by using a ratio $R_1/R_2$ of said levels and expected attenuation for said first and second signals, wherein the receiver assembly comprises a first receiver for receiving the first signal and a second receiver for receiving the second signal;

the distance detector assembly comprises a first level detector for measuring said level $R_1$, a second level detector for detecting said level $R_2$, and a calculating unit for calculating the distance between the first and second objects by using the following equation:

$$L = \frac{1}{\alpha_2 - \alpha_1} \log_e \left( \frac{R_1}{R_2} \cdot \frac{S_2}{S_1} \right)$$

where

L=the distance between the first and second objects, $S_1$=a level of said first signal transmitted from said transmitter assembly, $S_2$=a level of said second signal transmitted from said transmitter assembly, $\alpha_1$=attenuation factor per unit distance for said first signal traveling between the first and second objects, $\alpha_2$=attenuation factor per unit distance for said second signal traveling between the first and second objects.

15. A system according to claim 13 further comprising amplifying means for amplifying the first and second signals by a same factor prior to level determination.

16. A system according to claim 13 further comprising a corrective setting unit for adjusting calculation of the distance between the first and second objects based upon existing climatic conditions between the first and second objects.

17. A system according to claim 16 further comprising a climatic condition detector which detects existing climatic conditions between the first and second objects.

18. A system for determining a distance between first and second objects comprising a transmitter assembly for transmitting a first signal at a first frequency and a second signal at a second frequency which is different than said first frequency, said transmitter assembly being associated with the first object;

receiver assembly associated with the second object for receiving said first and second signals from the first object;

a distance detector assembly for determining a level $R_1$ of said first signal and a level $R_2$ of said second signal which have been received and for calculating the distance between the first and second objects by using a ratio $R_1/R_2$ of said levels and expected attenuation for said first and second signals;

a corrective setting unit for adjusting calculation of the distance between the first and second objects based upon existing climatic conditions between the first and second objects;

a climatic condition detector which detects existing climatic conditions between the first and second objects, wherein said climatic condition detector comprises a light emitter and a reflected light detector for detecting amounts of rain and/or fog.

19. A system for determining a distance between first and second objects comprising a transmitter assembly for transmitting a first signal at a first frequency and a second signal at a second frequency which is different than said first frequency, said transmitter assembly being associated with the first object;

receiver assembly associated with the second object for receiving said first and second signals from the first object;

a distance detector assembly for determining a level $R_1$ of said first signal and a level $R_2$ of said second signal which have been received and for calculating the distance between the first and second objects by using a ratio $R_1/R_2$ of said levels and expected attenuation for said first and second signals;

a corrective setting unit for adjusting calculation of the distance between the first and second objects based upon existing climatic conditions between the first and second objects;

a climatic condition detector which detects existing climatic conditions between the first and second objects, wherein said climatic condition detector comprises a rain gage.

20. A system according to claim 13 further comprising a correcting unit including a second transmitter assembly transmitting (a) a first correcting signal at a frequency equal to said first frequency toward a receiver spaced at a known distance from said second transmitter assembly and (b) a second correcting signal at a frequency equal to said second frequency toward a receiver spaced at a known distance from said second transmitter assembly for obtaining data for adjusting calculation of the distance between the first and second objects due to existing climatic conditions.

21. A system for determining a distance between first and second objects comprising a transmitter assembly for transmitting a first signal at a first frequency and a second signal at a second frequency which is different than said first frequency, said transmitter assembly being associated with the first object;

receiver assembly associated with the second object for receiving said first and second signals from the first object;

a distance detector assembly for determining a level $R_1$ of said first signal and a level $R_2$ of said second signal which have been received and for calculating the distance between the first and second objects by using a ratio $R_1/R_2$ of said levels and expected attenuation for said first and second signals;

a correcting unit including a second transmitter assembly transmitting (a) a first correcting signal at a frequency equal to said first frequency toward a receiver spaced at a known distance from said second transmitter assembly and (b) a second correcting signal at a frequency equal to said second frequency toward a receiver spaced at a known distance from said second transmitter assembly for obtaining data for adjusting calculation of the distance between the first and second objects due to existing climatic conditions, wherein said correcting unit adjusts for existing climatic conditions by calculating an attenuation factor $\alpha$ for each of said first and second signals by using the following equation:

$$\alpha = -\frac{1}{D} \log_e \left( \frac{R_3}{S_3} \right)$$

where

D=the known distance from said second transmitter to said receiver, $S_3$=a level of a respective correcting signal transmitted from said second transmitter assembly, $R_3$=a level of said respective correcting signal received by the receiver.

22. A method of measuring a distance between first and second objects comprising the steps of transmitting first and second signals of electromagnetic waves at respective first and second transmit levels $S_1$, $S_2$ from the first object toward the second object;

selecting frequencies for the first and second signals such that the frequency of the first signal is different than the frequency of the second signal;

receiving said first and second signals transmitted from the first object at the second object;

detecting first and second levels $R_1$, $R_2$ for the first and second signals which have been received at the second object;

using the first and second transmit levels $S_1$, $S_2$ and a ratio of the first and second detected levels $R_1/R_2$ to calculate the distance between the first and second objects based upon expected attenuation of the first and second signals.

23. A method according to claim 22 further comprising adjusting the attenuation of the first and second signals based upon climatic conditions.

24. A method according to claim 22 further comprising the step of detecting climatic conditions and adjusting the calculation of the distance between the first and second objects based upon climatic conditions detected.

25. A method according to claim 22 further comprising storing in memory attenuation factors corresponding to various climatic conditions;

detecting a current climatic condition;

obtaining an adjusted attenuation factor from the memory corresponding to the current climatic condition detected;

using the adjusted attenuation factor to calculate the distance between the first and second objects.

26. A method of measuring a distance between first and second objects comprising the steps of transmitting first and second signals of electromagnetic waves at respective first and second transmit levels $S_1$, $S_2$ from the first object toward the second object;

selecting frequencies for the first and second signals such that the frequency of the first signal is different than the frequency of the second signal;

receiving said first and second signals transmitted from the first object at the second object;

detecting first and second levels $R_1$, $R_2$ for the first and second signals which have been received at the second object;

using a ratio of the first and second detected levels $R_1/R_2$ to calculate the distance between the first and second objects based upon expected attenuation of the first and second signals;

calculating the distance between the first and second objects by using the following equation:

$$L = \frac{1}{\alpha_2 - \alpha_1} \log_e \left( \frac{R_1}{R_2} \cdot \frac{S_2}{S_1} \right)$$

where

L=the distance between the first and second objects, $S_1$=a level of said first signal transmitted from said transmitter assembly, $S_2$=a level of said second signal transmitted from said transmitter assembly, $\alpha_1$=attenuation factor per unit distance for said first signal traveling between the first and second objects, $\alpha_2$=attenuation factor per unit distance for said second signal traveling between the first and second objects.

27. A method of measuring a distance between first and second objects comprising the steps of transmitting first and second signals of electromagnetic waves at respective first and second transmit levels $S_1$, $S_2$ from the first object toward the second object;

selecting frequencies for the first and second signals such that the frequency of the first signal is different than the frequency of the second signal;

receiving said first and second signals transmitted from the first object at the second objects;

detecting first and second levels $R_1$, $R_2$ for the first and second signals which have been received at the second object;

using a ratio of the first and second detected levels $R_1/R_2$ to calculate the distance between the first and second objects based upon expected attenuation of the first and second signals;

transmitting a third signal at a third frequency which is different than said first and second frequencies from the first object to the second object;

receiving said third signal transmitted from the first object at the second object;

detecting a third level $R_3$ for said third signal which has been received at the second object;

using a ratio of the first and third detected levels $R_1/R_3$ to calculate the distance between the first and second objects based upon expected attenuation of the first and third signals;

averaging the distance calculated using the ratio $R_1/R_2$ with the distance calculated using the ratio $R_1/R_3$.

28. A method according to claim 22 further comprising determining an attenuation factors $\alpha_1$ for said first and second signals by the steps of:

transmitting a first correcting signal, at a known level $S_4$ and at a frequency equal to said first frequency, toward a receiver spaced at a known distance $D_1$;

receiving said first correcting signal and detecting a level $R_4$ for said first correcting signal which has been received;

calculating the attenuation factor $\alpha_1$ for said first signal on the basis of said known level $S_4$, said known distance $D_1$ and said detected level $R_4$.

29. A method according to claim 28 further comprising determining an attenuation factor $\alpha_2$ for said second signal by the steps of:

transmitting a second correcting signal, at a known level $S_5$ and at a frequency equal to said second frequency, toward a receiver spaced at a known distance $D_2$;

receiving said second correcting signal and detecting a level $R_5$ for said second correcting signal which has been received;

calculating the attenuation factor $\alpha_2$ for said second signal on the basis of said known level $S_5$, said known distance $D_2$ and said detected level $R_5$.

30. A distance measuring system according to claim 1 wherein the first electromagnetic wave has a frequency of about 30 GHz.

31. A distance measuring system according to claim 1 wherein the second electromagnetic wave has a frequency of about 60 GHz.

32. A method according to claim 22 further comprising storing in memory attenuation factors for the first signal corresponding to various climatic conditions;

storing in memory attenuation factors for the second signal corresponding to various climatic conditions;

detecting a current climatic condition;

selecting adjusted attenuation factors for the first and second signals corresponding to the current climatic condition detected;

using the adjusted attenuation factors to calculate the distance between the first and second objects.

* * * * *